(12) United States Patent
Ramirez et al.

(10) Patent No.: US 7,739,499 B2
(45) Date of Patent: Jun. 15, 2010

(54) CHECK ANTI-FRAUD SECURITY SYSTEM

(75) Inventors: Rodolfo Ramirez, Mexico City (MX);
Armando Rangel, Mexico City (MX);
Eugenio Jimenez Campos, Mexico City (MX)

(73) Assignee: Servicios Especializados Y Tecnologia Informatica, S.A., Mexico (MX)

( * ) Notice: Subject to any disclaimer, the term of this patent is extended or adjusted under 35 U.S.C. 154(b) by 1564 days.

(21) Appl. No.: 10/366,277

(22) Filed: Feb. 13, 2003

(65) Prior Publication Data

US 2003/0219122 A1 Nov. 27, 2003

Related U.S. Application Data

(60) Provisional application No. 60/357,216, filed on Feb. 15, 2002.

(51) Int. Cl.
*H04L 9/32* (2006.01)
(52) U.S. Cl. ............................. 713/168; 713/193; 726/2
(58) Field of Classification Search ................ 713/185, 713/193, 168; 235/379; 705/26; 173/193
See application file for complete search history.

(56) References Cited

U.S. PATENT DOCUMENTS

| | | | |
|---|---|---|---|
| 5,085,417 A * | 2/1992 | Copham | 270/1.02 |
| 5,201,010 A * | 4/1993 | Deaton et al. | 382/139 |
| 5,475,756 A | 12/1995 | Merritt | |
| 5,491,325 A | 2/1996 | Huang et al. | |
| 5,546,471 A | 8/1996 | Merjanian | |
| 5,673,320 A * | 9/1997 | Ray et al. | 713/176 |
| 5,838,814 A * | 11/1998 | Moore | 382/115 |
| 5,845,008 A | 12/1998 | Katoh et al. | |
| 5,936,219 A * | 8/1999 | Yoshida et al. | 235/379 |
| 6,003,763 A * | 12/1999 | Gallagher et al. | 235/379 |
| 6,181,814 B1 | 1/2001 | Carney | |
| 6,390,362 B1 * | 5/2002 | Martin | 235/379 |

* cited by examiner

*Primary Examiner*—Kimyen Vu
*Assistant Examiner*—Yogesh Paliwal
(74) *Attorney, Agent, or Firm*—F.Chau & Associates, LLC

(57) ABSTRACT

A system and method for check anti-fraud security includes a system installed with an optional printer for printing the check base identification, a camera/scanner/reader coupled to the production printer for imaging/scanning/reading check base identification and MICR line information of the check, a data processing equipment to generate the unique check identification based on the imaged data, a database in communication with the camera/scanner/reader for storing the unique identification information, and a check validation infrastructure in communication with the database for validating the check in accordance with the database when the check is issued to a recipient; and further includes a corresponding method for identifying a check base stock, imaging check base identification and MICR line information of the printed check, generating the unique check identification, storing the unique check identification information in a database and validating the check in accordance with the database when the check is issued to a recipient.

36 Claims, 7 Drawing Sheets

CHECK ANTI-FRAUD SECURITY SYSTEM

CROSS-REFERENCE TO RELATED APPLICATION

This application claims benefit of U.S. Provisional Application No. 60/357,216, entitled "Check Anti-Fraud Security System", filed Feb. 15, 2002 and commonly assigned herewith, the disclosure of which is incorporated by reference herein in its entirety.

BACKGROUND

Despite increased security measures for check base stock, check fraud continues to be a growing worldwide problem. The current increased security measures generally increase the costs of checks as well as cause verification induced delays at cashing points that adversely affect the check recipients and the checking customers. Unauthorized users typically alter and forge checks in a number of ways, such as, for example, by using color printers and/or copiers, stealing base stock and/or security inks, bribing check printer operators, and the like.

Checks continue to be a common payment form in the United States of America ("USA"), where about 70 billion checks are issued annually. Check fraud in the USA has grown from about 13 billion dollars per year in 1997 to about 19 billion dollars per year in 2001. One reason for the current magnitude of the check fraud problem is that check security has heretofore been directed towards physical elements on the paper, without identifying and registering the base stock in an information system.

For descriptive purposes, the following terms are predefined:

"Planilla" or "Base"—Cut sheet security base stock, typically with 3, 4, 5 or 7 checks per sheet. "Continuous Check Forms"—Security base stock with traction perforations in different formats.

"Check base ID"—A data set (numeric, alphanumeric explicit or coded) that identifies each security paper check during the check production process.

"MICR line" The line printed in magnetic ink characters (E13B or CMC 7) near the bottom edge of the check that typically has the bank id, account number and check number with other data.

"Package" A delivery unit of base stock paper.

"Check"—One fully identified check.

"Checkbook"—Finished production unit. A book, containing several checks, inserts and other relative forms, which is delivered to the account holder as required.

"Valid Check ID"—The unique identification of a produced check.

"Invalid Check"—Any check that does not have a matching unique identification within the Valid Check Database.

"Live Check"—A check in the possession and responsibility of the account holder and considered to be at risk of alteration, theft and cloning.

"Live Check Database"—A database containing identification data for the valid checks at risk.

"Positive Pay"—A protection procedure in which the account owner sends the issued check information to the bank or check clearing service provider on a daily basis. Fraudulent checks are identified when their data is compared to the issued check file. Checkbolt has the tools to allow an easy and interactive report through e-mail or Internet for a relatively low volume of checks and through automatic file transfer protocol ("FTP") tools for larger volumes of checks.

"Electronic signature"—The data resulting from an algorithm or a mathematical function that is calculated once a check is complete and ready to be issued for payment. It is a function of its amount, payment instructions and unique identification.

The Life of a Check

Checks are produced in specialized print shops that use as raw material security paper and special inks. The process starts at the printing presses to produce the check base stock, i.e. the security paper with the bank/customer desired background image. The production of the base stock might require the use of several steps with different equipment. The produced base stock sometimes is stored before continuing with the check production process and all the movements in and out of these secure storage areas must be controlled. In the pre-marking stage of the process, the base stock is converted into a blank check by printing the name and address of the account owner and the MICR line that contains at least the bank id, account number and the check number. Once the blank checks are printed, they are finished in checkbooks or fan fold packages. Usually at this stage there is a quality assurance station. The produced checkbooks are delivered using secure transportation to the bank and from there to the customer. There are cases were the customer orders the checkbooks directly from the print shop and they are delivered directly to him. The account owner uses the checks to make different payments by filling in a blank check with the amount to be paid, the name of the beneficiary or payee and signing it. When the account owner opened the check account, the name and address as well as the valid signatures and pay instructions were registered at the Bank. When the check is presented for cashing it should be validated in many ways to verify ifs correctness and authenticity: authentic document without alterations, valid and standing account, enough funds to cover it correct signature(s), etc.

SUMMARY

These and other drawbacks and disadvantages of the prior art are addressed by Checkbolt, a system and method for check anti-fraud security. Checkbolt is based on structuring and capturing a unique data identification for each check, that integrated in an information system will allow a close follow up of all the events of that check from it's production to it's payment. The system requires that all check security stock (cut sheet or continuous forms) have a Check base ID printed as early as possible in the printing process. The Checkbolt system is installed on any current check printing process and any bank/service provider data processing infrastructure, Checkbolt can generate many types of reports from the database, the type of the report depending on customer needs. The system includes a camera/scanner/reader for imaging/scanning/reading unique identification information of the check, a database in communication with the camera/scanner/reader for storing the unique identification information, and a check validation infrastructure in communication with the database for validating the check in accordance with the database when the check is issued to a recipient.

The corresponding method includes a user selected structure of the unique identification that is a mathematical function of the Check base ID and the MICR line, imaging/scanning/reading unique identification information of a printed check, storing the unique check identification information in a database, providing the check to an account owner, and validating the check in accordance with the database when the check is issued to a recipient.

These and other aspects, features and advantages of the present disclosure will become apparent from the following description of exemplary embodiments, which is to be read in connection with the accompanying drawings.

BRIEF DESCRIPTION OF THE DRAWINGS

The present disclosure teaches check anti-fraud security in accordance with the following exemplary figures, in which.

DETAILED DESCRIPTION OF PREFERRED EMBODIMENTS

A check security system is provided for reducing check fraud by generating, capturing and storing a unique identification for each produced check, i.e., a Valid Check identification ("ID"), that will allow the certification of the check authenticity when presented for payment and maintaining historic information of each production stage or transaction of each check, from the base stock production to the check payment process. The system reduces check fraud and tends to settle the protected organizations as "hard targets" from the perspective of would-be criminals. The system prevents fraudulent events by identifying a fraudulent transaction before it is completed. Thus, it provides a loss prevention tool, a criminal deterrent system, and a criminal investigation information source.

The system is designed to transfer the security elements from physical paper to logical data. Once the information resides on a digital system, each piece of data can be followed as closely as the particular risk demands. Thus, the system can provide different levels of protection, depending on the amount of information captured and processed by the system.

Figure 1:
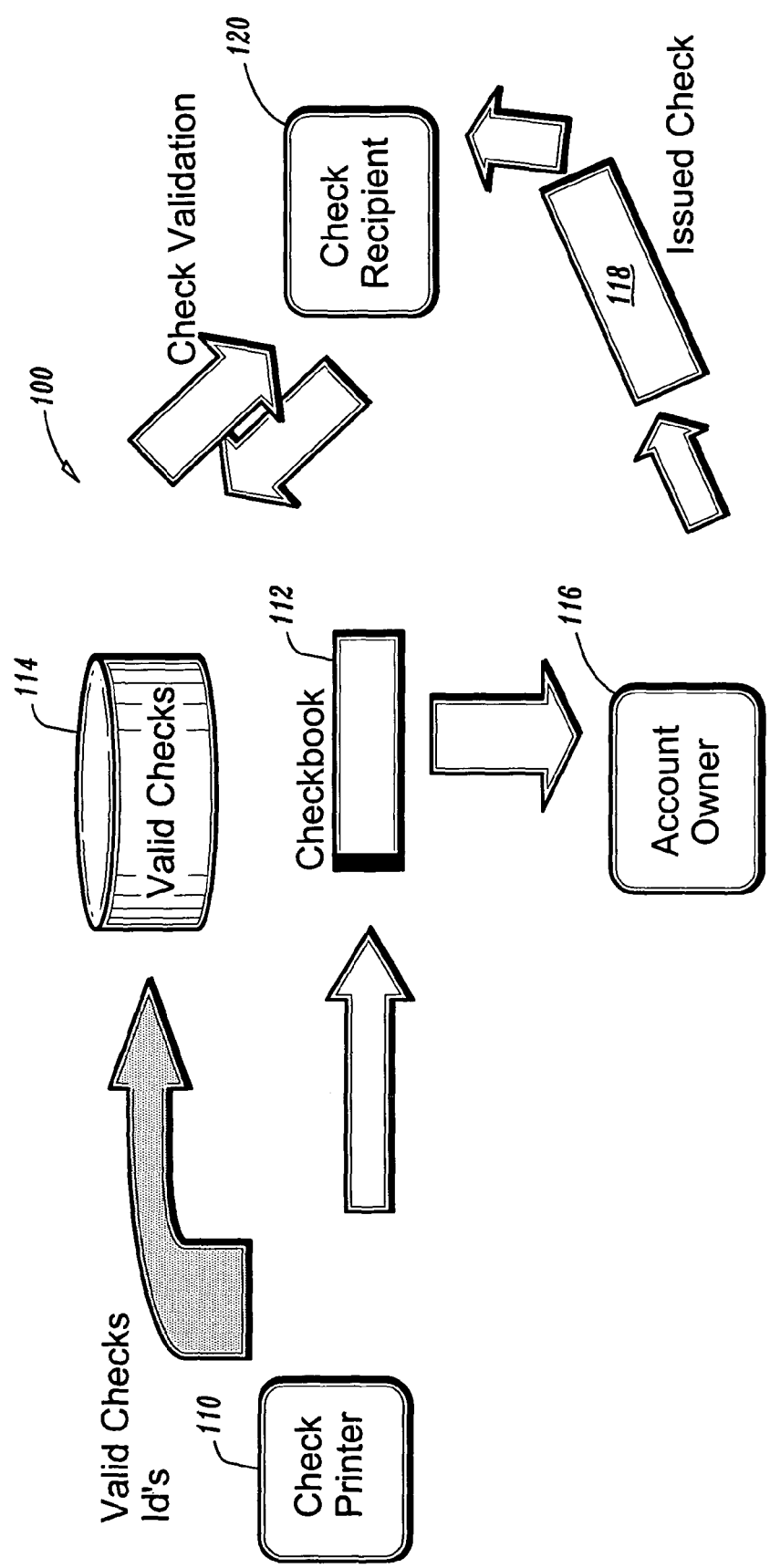
FIG. 1 shows a general block diagram of the check anti-fraud security system.

As shown in FIG. 1, an exemplary check antifraud security system is indicated generally by the reference numeral 100. Checkbolt is a system that can be integrated to any check printing process and any bank data processing infrastructure.

Checkbolt is a system that can be integrated to any check printing process and any bank data processing infrastructure.

The checks are produced at a print shop 110 where the security system automatically captures the Valid Check Id's and the production historic information through imaging cameras, scanners or readers. The print shop delivers finished checkbooks 112 and a produced check data file containing the Valid check ID's of each produced check in a delivered checkbook. The produced check data file updates the Valid check data base 114, which may be maintained by a check clearing service provider or a bank, for example. A checkbook 112 is issued to an account owner 116 updating the check status marking them as in possession of the account owner at the Valid check data base 114. The account owner may then issue individual checks 118, such as in payment for goods and/or services, to a check recipient 120. The account owner might choose the positive pay facilities of the security system to report the issued check data to the valid check data base. This will update again the check information in the data base and protect the account owner from alteration of the check data, stealing or cloning an issued and reported check. At the time of receipt of a check 118, the check recipient 120 performs check validation in signal communication with the wild check database 114. The result of the validation is a valid/invalid answer. Due to the structure of the system and the structure of the unique check identification that is generated automatically at the production time, there is no way to know, predict or have uncontrolled -access to the unique identification of a produced check.

Figure 2:
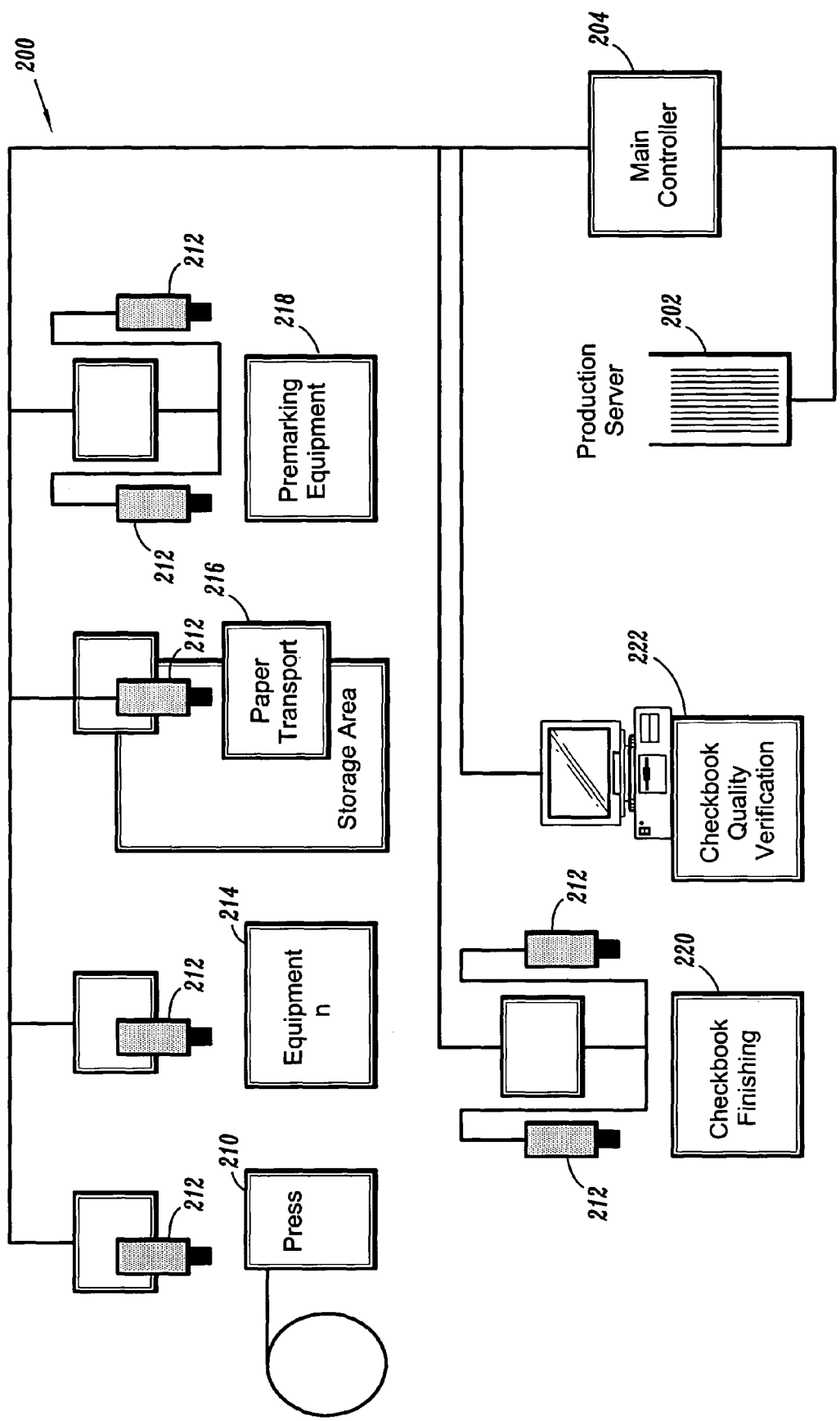
FIG. 2 shows a general block diagram of a First Phase check production portion of the check anti-fraud security system of FIG. 1.

Turning to FIG. 2, a first phase or production subsystem of the check anti-fraud security system is indicated generally by the reference numeral 200. The system 200 includes a production server 202 in signal communication with a main controller 204 and one or more cameras/scanners/readers 212 for collecting Check base IDs and MICR line data using Optical Character Recognition tools from images of the check base stock during the check printing process. Each camera/scanner/reader 212 is in signal communication with the main controller 204. Each camera/scanner/reader captures data from each equipment in the process like the press 210, other equipment 214 for further processing, and paper transport equipment 216 at a storage area. At the premarking equipment 215 the MICR line is printed and a camera/scanner/reader 212 captures the Check base ID and the MICR line data to generate at that point the Valid Check Identification. The checks am passed to a checkbook finishing station 220, and once more imaged by one or more cameras/scanners/readers 212. At the checkbook quality verification station there is a terminal of the security system that allows the quality inspectors to verify and register statiscal data of the quality of the produced checkbooks.

Figure 3:
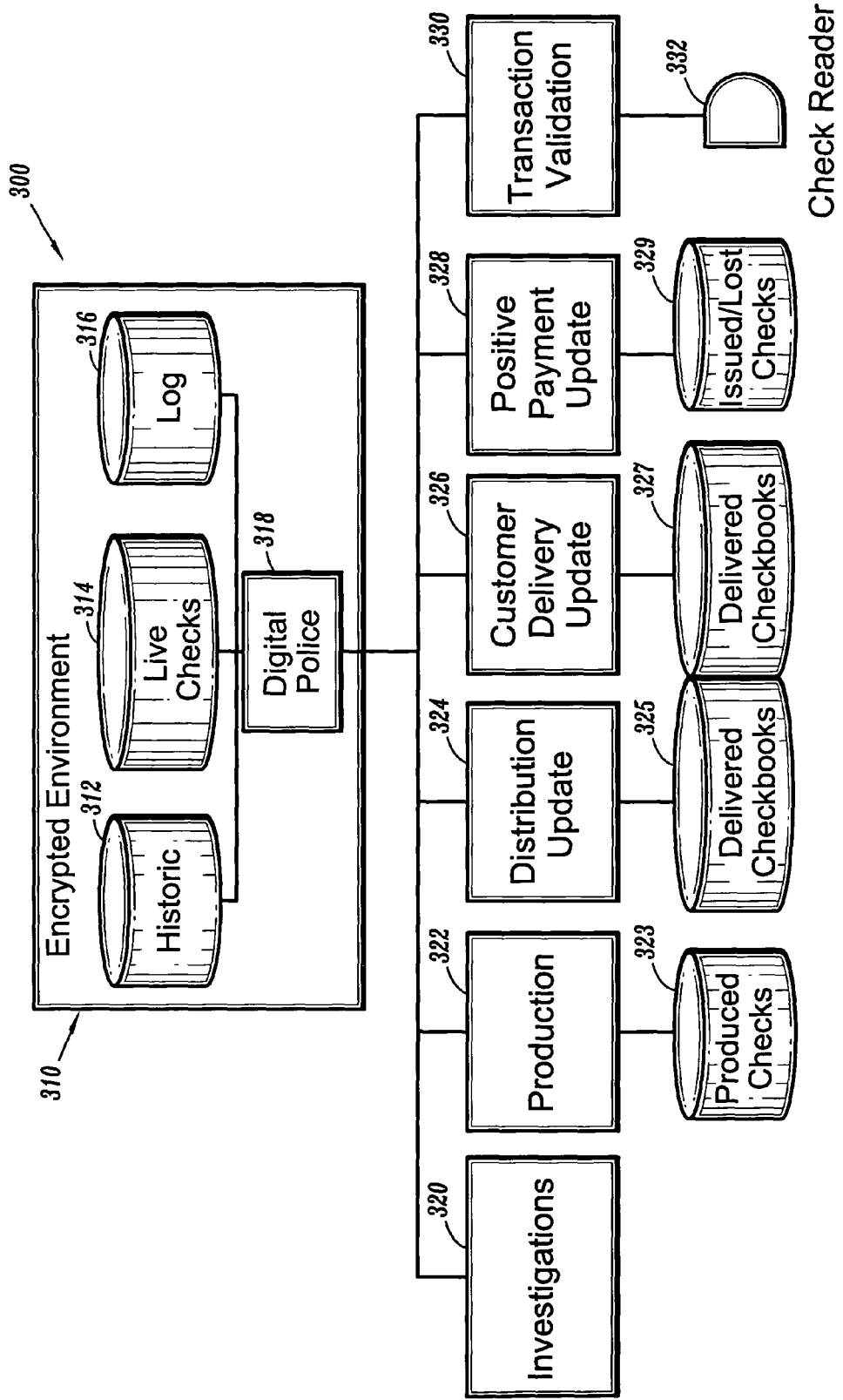
FIG. 3 shows a block diagram of a Second Phase bank/customer portion of the check anti-fraud security system of FIG. 1.

Turning now to FIG. 3, a second phase or bank/customer subsystem of the check anti-fraud security system is indicated generally by the reference numeral 300. The system 300 includes an encrypted environment 310. The encrypted environment 310 containing the Valid Check database that includes a historic database 312, a live checks database 314, and a log database 316, each in signal communication with a digital police unit 318. The encrypted environment may be realized by the provision of encrypted access paths connected to each of the databases.

The digital police unit 318 controls and records all input/output activities of the encrypted environment 310 registering in the log database source, destination, action, result, date, time for each activity, and is in signal communication with an investigations unit 320, a production unit 322, a distribution update unit 324, a customer delivery update unit 326, a positive payment update unit 328, and a transaction validation unit 330. The production unit 322 receives the produced checks file 323 from the check producer (print shop 110), processes the data and updates the historic database 312. The distribution process to each branch or distribution centre generates a delivered checkbook file 325 that is generated and processed by the distribution update unit 324 and updates the historic database 312. The customer delivery update unit 326 controls the process of issuing a checkbook to an account owner and generates the delivered checkbook file 327 and updates with this information the historic database 312 and the live check database 314. When an account owner uses the positive pay abilities of the security system the positive payment update unit 328 provides the tools to provide, according with the volume, an interactive user interface or an automatic data transfer module to report the data of issued, cancelled or lost checks. The information is received in an issued/lost checks file 329 and with this information the Live check database is updated. The transaction validation unit 330 is in signal communication with teller terminals and check readers 332. The objective of this unit is to validate the check information keyed by the teller or automatically read by the check reader 332 against the live check data base 314, delivering a binary answer: valid/invalid.

Figure 4:
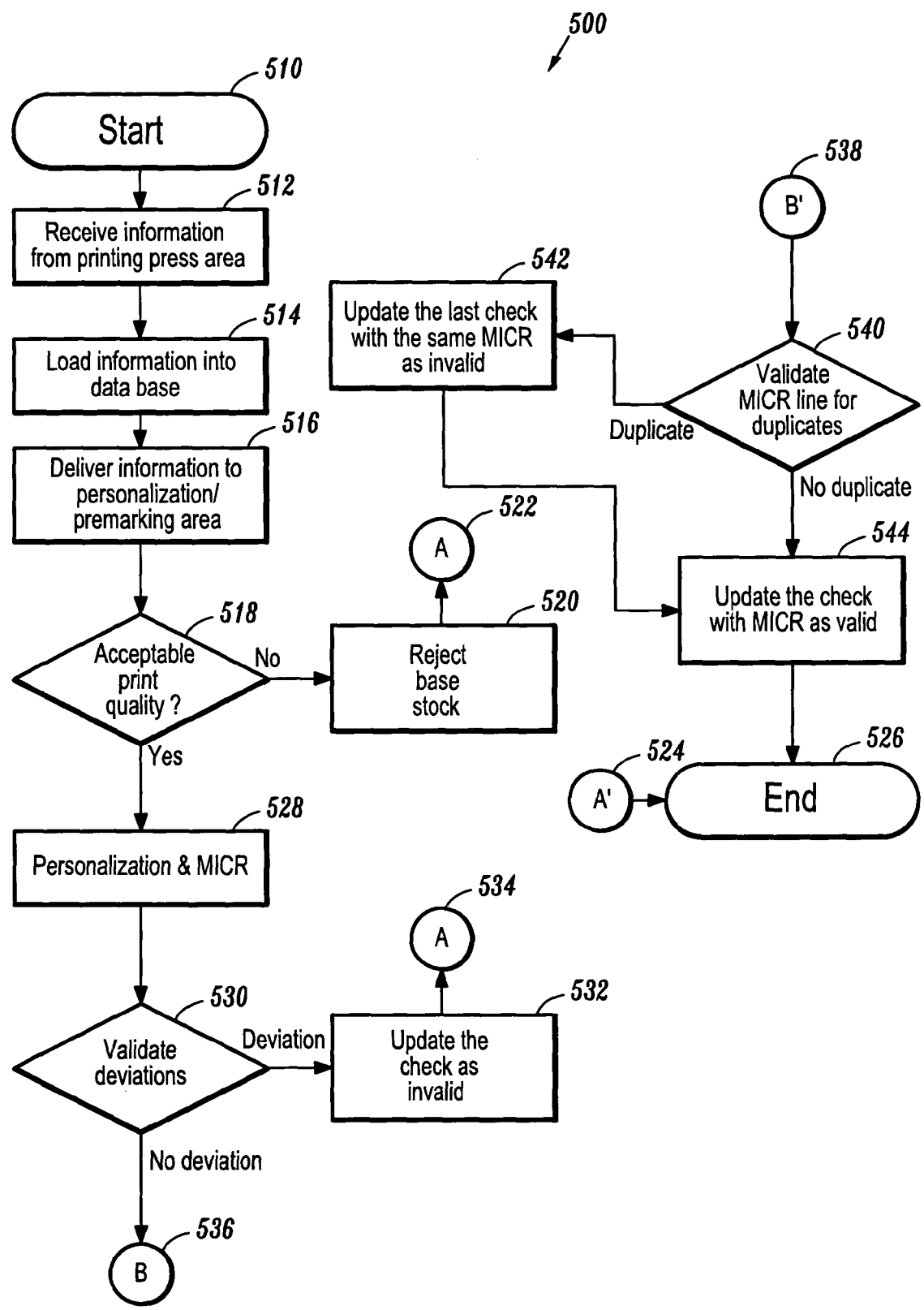
FIG. 4 shows an application flow diagram for the check production portion of FIG. 2.

Turning to FIG. 4, a flow diagram for the first phase—production control of the check anti-fraud security system is indicated generally by the reference numeral 500. It is emphasized that the identification of check security stock (Check base ID) should be accomplished as early as practicable in the check form printing process. A start block 510 passes control to a function block 512 for receiving information from imaging cameras/scanners/readers installed in the printing press area. Block 512 passes control to a function block 514 for loading the captured information into a database, The data captured at the different stages of the printing process allows Checkbolt to define and control production wastes that could be used in check forgery. This information will be preserved at the Historic database. Block 514, in turn, passes control to a function block 516 for delivering information on check personalization to the pre-marking area to verify which identified Check blank bases will be entering the personalization printing and the MICR line printing. Following block 516, a decision block 518 determines whether the printing quality is acceptable. If the print quality is not acceptable, control passes to a function block 520 to reject the base stock, and hence to an END block 526 via intermediate diagrammatic connectors 522 and 524, respectively. If the print quality is acceptable, a step 528 performs personalization printing and adds a corresponding MICR line, according with the data received from the production data file for that batch and then passes control to a decision block 530. The decision block 530 validates deviations like check base stock detected as waste or not manufactured within the batch being processed or not assigned to the current operator of a predefined equipment or even worse, the check base stock was not manufactured at the plant. If a deviation is found, passes control to a function block 532. The block 532 updates the check as invalid in the database, and proceeds to the END block 526 via intermediate diagrammatic connectors 534 and 524, respectively. If no deviations are found at the decision block 530, control passes to a decision block 540 via intermediate diagrammatic connectors 536 and 538, respectively.

MICR line duplicates can occur as an error or as a result of a reprocess due to production problems in the following stages but there should be only one MICR line printed and registered at the produced check file. The decision block 540 validates the MICR line for duplicates. If a duplicate is found, control passes to a function block 542 to update the database entry for the last check produced with the same MICR line as invalid, flag a deviation and then passes control to a function block 544. If the decision block 540 finds no duplicates, control passes directly to the function block 544. This function block 544 performs the core function of the check anti-fraud security system. The Check base ID data and the MICR line data are captured by the imaging camera/scanner/reader in this stage and with the user selected structure function, the UNIQUE CHECK IDENTIFICATION is integrated and then updates the valid produced check database entry for the new check having the verified MICR line are valid printed on an also valid check base ID, and passes control to the END block 526. All this process is performed automatically at production speed.

Figure 5:
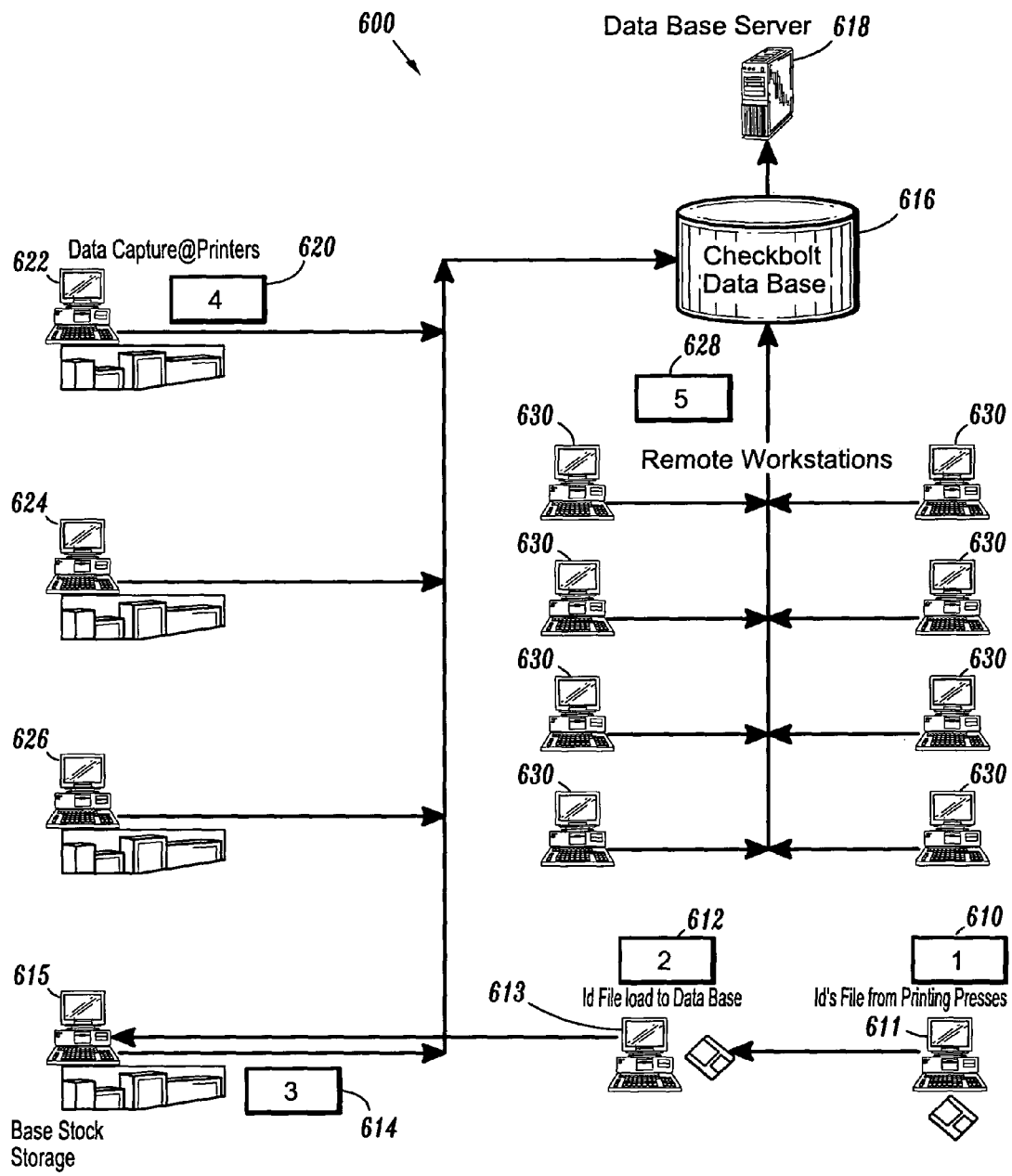
FIG. 5 shows a connectivity diagram for the check anti-fraud security system of FIG. 1.

Turning now to FIG. 5, a connectivity diagram for a check anti-fraud security system is indicated generally by the reference numeral 600. Checkbolt is a system that controls the whole check production process, including each printing press and other equipment used on the check base stock production, all the printing equipment used at the pre-marking area. The control extends to the base stock assigned to each operator of each pre-marking equipment unit for a given shift. Each operator or supervisor has to sign into the system using a biometric device to avoid access misuse. Each time an operator receives a blank check stock batch, the operator signs for its reception along with the person delivering the batch. The system knows each Check base ID in the batch and each Check base ID finished so when a given operator finishes production, the system knows which Check base IDs the operator must return as not used or as damaged for destruction. The system 600 includes an identification data file 610 from one or more printing presses 210 of FIG. 2, stored on a data storage device 611. An identification file 612 for loading to a database is stored on a device 613 when the presses are in a different physical location, and passed to a base stock storage system 615. The base stock storage system 615 maintains a data file 614 for transference to a valid check database 616 maintained on a database server 618. An information data file 620 is produced by first, second and the printer data capture device 622, 624 and 626, respectively, and transferred to the check database 616. In the Second phase—Bank/customer, the Valid check database, integrated to the data processing infrastructure of the bank using its wide area network ("WAN"), allows the verification of the checks presented for payment at any teller or POS connected to the Bank WAN.

Data transactions 628 are received from one or more remote workstation clients 630 at Banks and Points-Of-Sale ("POS"), and verified against the valid check database 616.

Figure 6:
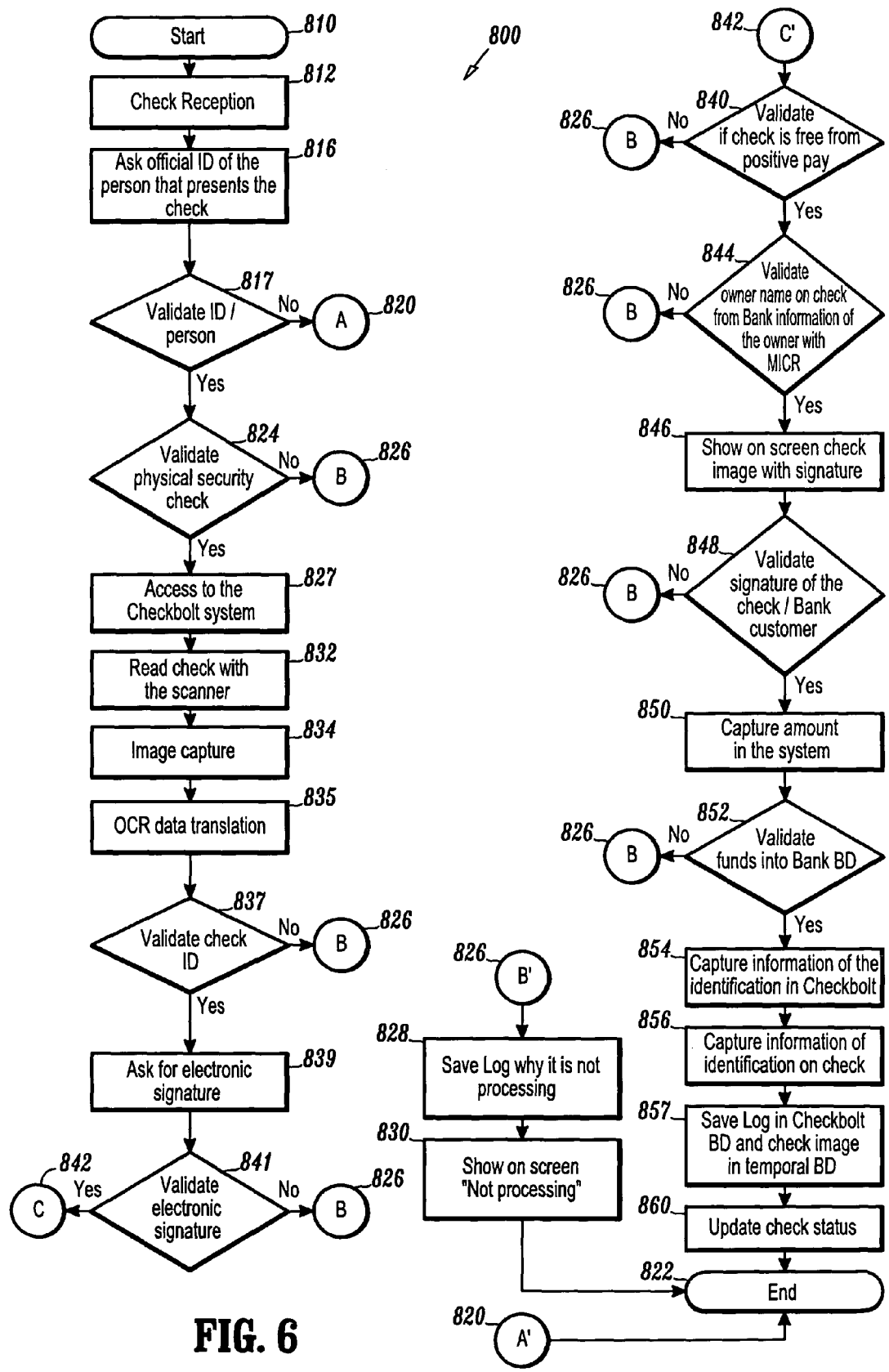
FIG. 6 shows a flow diagram for a bank process usable with the system of FIG. 3.

Turning to FIG. 6, an exemplary embodiment bank teller process for the Second Phase bank/customer subsystem 300 of FIG. 3 is indicated generally by the reference numeral 800. A start block 810 passes control to a function block 812 to perform the reception of a check by a teller at his workstation in a branch office of the bank where the Checkbolt system is installed. The block 812 leads to a function block 816 to request an official identification of the person presenting a check. The block 816 leads to a decision block 817 that determines whether the identification matches that of the person presenting the check. If the identification does not match, control passes through the diagrammatic connector 820 to an end block 822. If the identification does match, control passes to another decision block 824 to validate the physical security of the check such as security features of the security paper, altered amount, altered payee, etc. If the receiver finds something wrong with the physical security of the check, control passes through a diagrammatic connector 826 to a function block 828, which saves a log register indicating why the check was not processed. The block 828 passes to a function block 830, which displays a message that the check was riot processed on the screen of the teller workstation. The block 830, in turn, passes control to the end block 822.

If the block 824 does validate the physical security of the check, then control passes to a function block 827—to access the Checkbolt antifraud security system, which, in turn, passes control to a function block 832 to read the check data, This can be done manually by keying the Check base ID and the MICR line data or automatically with a check reader/ scanner. The block 832 leads to a block 834 to capture an image of the check, which leads, in turn, to a function block 835 to translate the check information MICR line data and Check base ID by optical character recognition ("OCR"). The block 835 leads to a decision block 837 to integrate the unique check identification information and validate it against the Checkbolt database. If the validation fails, control passes through the diagrammatic connector 826 as previously described.

Checkbolt optionally allows verification of additional security measures like electronic signature, positive pay, check account owner data verification, signature verification and enough funds verification. The diagram shows the system with all the features included.

If the validation succeeds, control passes to a function block 839 to request an electronic signature. The block 839 leads to another decision block 841 to determine whether the electronic signature is valid for the check. If the electronic signature is not valid, control passes through the diagrammatic connector 826 as previously described. If the electronic signature is valid, control passes through a diagrammatic connector 842 to a decision block 840 to validate the check data against the positive pay report generated by the account owner after he generated the check. If the positive pay option is being used and the check is not within the positive pay report, control passes through the diagrammatic connector 826 as previously described. If the check is free of this requirement, control passes to a decision block 844 for validating the check account owner's name against bank information corresponding to the MICR line data (the system shows on the screen the name of the owner, then bank teller verifies the name on the check with the name on the screen). If the owner's name does not match, control passes through the diagrammatic connector 826 as previously described.

If the check owner's name matches at decision block 844, control passes to a function block 846 to display the check signature image. The block 846 leads to a decision block 848 to validate the signature on the check with the signatures registered at the bank by the account owner. If the signature does not match any of the registered signatures, control passes through the diagrammatic connector 826 as previously described. If the decision block 848 successfully validates the signature, control passes to a function block 850 to capture data corresponding to the check amount into the system. The block 850 leads to a decision block 852 to validate the check amount against the funds available in that account in the bank database. If there are not enough funds in the account, control passes through the diagrammatic connector 826 as previously described.

If all the validations included in the system succeed, control passes to a function block 854 to save into the Checkbolt system, the identification information of the person that presented the check at the teller. The block 854 leads to a function block 856 to mark the checks as paid and write on it the identification information of the person that presented the check at the teller, and then leads to a function block 857 to save the corresponding register of a successful transaction on the log file within Checkbolt application database and to save the check image into a temporal database. The block 857 leads to a function block 860 to update the status of the check as paid in the Checkbolt database and the system takes this check out from live check database, passes it to the historic database and then leads to the end block 822.

Figure 7:
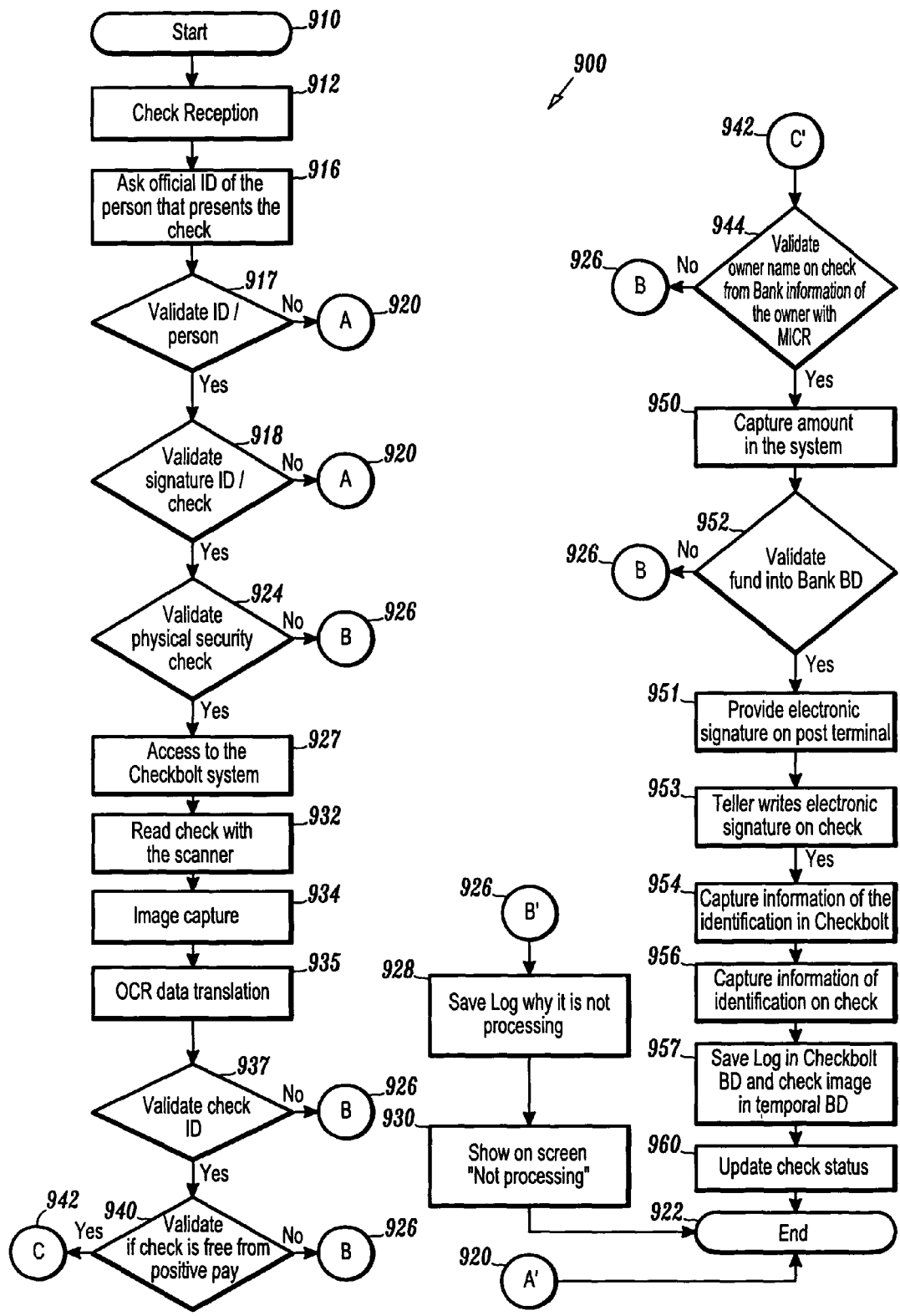
FIG. 7 shows a flow diagram for a point-of-sale process usable with the system of FIG. 3.

Turning now to FIG. 7, an exemplary embodiment point-of-sale process for the Second phase, bank/customer subsystem 300 of FIG. 3 is indicated generally by the reference numeral 900. A start block 910 passes control to a function block 912 to perform the reception of a check at a POS terminal in a commerce affiliated to a bank with the Checkbolt antifraud check security system. The block 912 leads to a function block 916 to request an official identification of the person who is presenting a check. The block 916 leads to a decision block 917 that determines whether the identification is valid and matches with the person presenting the check. If the identification does not match, control passes through the diagrammatic connector 920 to an end block 922. If the identification does match, control passes to a decision block 918 that determines whether the signature on the identification matches of the signature on the check. If the identification does not match, control passes through the diagrammatic connector 920 to the end block 922. If the identification does match, control passes to another decision block 924 to validate the physical security of the check such as security features on the document, etc. If the receiver finds something wrong in the physical security of the check, control passes through a diagrammatic cant actor 926 to a function block 928, which saves a log register indicating why the check was not processed. The block 928 passes to a function block 930, which display a message on a screen confirming that the check was not processed. The block 930, in turn, passes control to the end block 922.

If the block 924 does validate the physical security of the check, then control passes to a function block 927 the receiver/cashier access the Checkbolt system through the POS terminal, which, in turn, passes control to a function block 932 to read the check with the check MICR reader/image scanner connected to the POS terminal. The block 932 leads to a block 934 to capture an image of the check and process it, which leads, in turn, to a function block 935 to translate the check information (MICR data and Check base ID) using optical character recognition ("OCR"). The block 935 leads to a decision block 937 where the check unique id is calculated and validated against the multiple Check Unique identifications contained in the live check database.

If the validation fails, control passes through the diagrammatic connector 926 as previously described.

At the commerce cashier we can have two types of checks presented as payment: checks previously paid to the people presenting and endorsing them to the cashier and checks filled up in the presence of the cashier.

In the first case the process is identical to the process at the bank cashier from numeral 840 to 822.

If the check is filled up in the presence of the cashier and if the validation succeeds, control passes to a decision block 944 for validating the check owner's name against bank information corresponding to the MICR data captured by the system. The system shows on the screen the name of the account owner that corresponds to the MICR line data in the Bank database. If the owner's name does not match, control passes through the diagrammatic connector 926 as previously described.

If the check owner's name is validated at decision block 944, control passes to a function block 950 to capture data corresponding to the check amount into the system. The block 950 leads to a decision block 952 to validate the check amount against the available funds of the account in the bank database. If the validation fails, control passes through the diagrammatic connector 926 as previously described. If the validation succeeds, control passes to a function block 951 in which the system provides an electronic signature through the POS terminal. The block 951 leads to a function block 953 in which the cashier writes the electronic signature on the check. The block 953 leads to a function block 954 to save the personal identification information into the Checkbolt system. The block 954 leads to a function block 956 to write the personal identification information on the check, and then leads to a function block 957 to save a log register with the results of a successful transaction into a Checkbolt application database and to save the check image into a temporal database for future claims. The block 957 leads to a function block 960 to update the status of the check, the system takes this check out from the live check database, passes it to the historic database as paid and then leads to the end block 922.

The operation of the Checkbolt antifraud check security system is based on a unique check identification. Checks are verified by determining, based on this unique check ID, whether a check is valid or invalid. If the data (Check base ID and MICR line data) from a check presented for payment translates into a unique check id within the Checkbolt live check database, the check is valid. The answer is binary. This software identification prevents against misuse of security paper, steals of check base stock as well as many cases of forgery and counterfeiting.

With optional modules of the system it can also verify a valid account, the account owner name enough funds to cover the amount of the check, signature verification. With optional positive pay module, allows the account holder to inform of issued checks (e.g., amount and check payee), lost or stolen checks and cancelled checks. This module protects against misuse or fraud with valid checks and check cloning.

Based on the historical database, a fraud investigator can define individual responsibilities, and accounts for the possibility of delinquent identification when a check is presented at a point of sale.

The system records all the details of the path of the check through its life, registering date/time/shift/operator of each machine, equipment or workstation during the production process, the delivery to the account holder and the payment/cashing process. With all this information into the data base the system generates different types of the report like a security reports (transaction log, valid checks, invalid checks, etc.) and production reports (total of checks produced, operator balances, etc.) the types of thee report depend of the customer necessities.

The system has a very strong access security structure that allows the definition of the system administrator, the authorized users, and the functions they can perform in the system. Many of the processes require double user identifications or personal passwords. As an option, accepts biometric devices instead of passwords (e.g., fingerprint and/or retina reader) to further increase security.

A check anti-fraud security system embodiment is divided into two phases or subsystems. A first phase or production subsystem includes: 0) Capturing the Check base identification and the MICR line information. 1) Generation of a unique identification for each check. 2) Generation of a file of valid checks called the Produced Check File and delivery of it to the Bank/Customer phase. All check IDs that are not included in the file are invalid. 3) Control of security base stock, as closely as possible, and as early in the process as possible, with the ability to generate a detailed balance and individual responsibilities for each process step in order to minimize theft of security paper.

Generation of a unique identification for each check is achieved by identifying the base stock with a Check base ID and generating the unique check ID as soon as the MICR line is printed using a mathematical function. All the unique check identifications generated in a check production batch produces a file of valid checks called the Produced Check File. This defines the printer's responsibility. This Produced Check File is delivered to the second phase or Bank/Customer subsystem to update the databases on the Black Box (Historic database & Live Check Database). This requires a number of production control modules on each of the steps of the production process. Each production control module is integrated by an intelligent digital camera, scanner or reader system that can capture Check base IDs from the digital images from the security base stock passing through at production speed plus the information of the equipment, operator, shift, time and date of the moment each check passed through each production step. Thus, responsibilities are defined at the operator level to help criminal investigations, for example, by defining the origin of the fraud. A system server module or unit keeps track of the information captured in all the production control modules.

In the second phase or Bank/Customer subsystem, the transaction validation unit 330 of FIG. 3 verifies at the cashing point whether the presented check is a valid check. The production valid checks ID file updates the live check database 314. The live check database holds the check IDs for the valid checks in circulation. Only the checks IDs in the database identity valid checks. All other IDs are considered invalid.

This functionality rests on the integration of the live check database to the data processing infrastructure (ideally the check application) of the bank or verifying organization. With this structure, the verification process can be performed at every workstation or point of sale terminal connected to the bank network. Due to the security relevance of this database, it is contained in a black box that uses an encrypted structure and a controlled access. The black box is a hardware/software data storage structure that may be located at the bank or at the verifying organization.

The process at the First phase or Production subsystem begins by identifying the checks at the base stock level as early in the printing process as possible with the Check base ID. The identifier may be numeric, alphanumeric, a code (such as bar code, bi-dimensional matrix, and the like), consecutive or the result of an algorithm, for example; and can be visible or invisible. The system 200 of FIG. 2 then reads and records the identifier for the steps of the base stock printing process. This allows a very close follow-up of the status of each base stock unit, thereby discouraging base stock stealing and/or press operator bribing, and allows for the definition of responsibilities at the operator level.

During the pre-marking process 218, the MICR line and also the personalization data (check account owner name and address) are printed. At this point, the check anti-fraud security system generates the unique identification or Unique check ID for each check, associating the Check base stock identification (base stock=security paper with the bank/customer image) with the check/account number printed within the MICR line thereon. Before this pre-marking step, the check is undefined as it is merely security paper base stock. A blank check is defined by printing the magnetic ink character recognition ("MICR") line on security paper base stock.

There are standards used for the MICR characters, such as, for example, E13-B used in the USA, Canada and Mexico; or CMC7 used in Europe and some areas of South America. There are also standards for the position and length of the MICR line within the check. The cameras/scanners/readers of the production control modules of the present disclosure capture both E13-B and CMC7, and any field distribution within the MICR line. The unique check ID is integrated when the MICR line is printed so that there is no way of predicting the check ID beforehand, because it is unknown which base stock will be fed and which MICR line will be printed at any given moment.

Using intelligent cameras 212 with optical character recognition ("OCR") ability, scanners or readers, the system 200 reads, at production speeds, the check base stock identification and the MICR line data and then correlates them, such as, for example, by mixing them together or using an algorithm, to create the unique check ID. The unique check ID is recorded in a produced check file 323, which is the source for later validation at the cashing point.

The check base stock identification data capture for step 410 of FIG. 4 is a high priority security function and it is not allowed to pass security paper without being read, such that all production control modules have the additional capability of controlling the operation of the production/printing equipment where they are installed. Each production control module of the Checkbolt system must be fully functional before the security system allows production equipment to start production. In case of a security system module failure, the system will halt the production equipment. Thus, all modules are designed with a very high availability in order to keep production interruptions to a minimum.

There are different types of production control modules described as follows. All the production modules are connected to the production server 202 in a data network.

The press/collator module 210 captures check base stock identification data through the different steps of the production process 200 and transfers the information to the production server 202. Cameras/scanners/readers 212 are installed on the presses, collators, and like equipment at the deployment rate of one press/collator module for each equipment unit where control is desired. Due to the different types and models of the production equipment, the installation requires the integration of adequate bracketry for each case.

The local image capture controller 204 that receives the information from the cameras/scanners/readers, also processes it by applying the required filters or functions, for example Ultra violet filters for invisible fields, and sends the processed information to the server. The controller 204 employs a software application that handles the image and character recognition processing functions. Each module includes one or two high-speed OCR cameras, scanners or readers, depending on the width of the reading field. The cameras can be progressive or linear scan, depending on the number of data fields that the module requires to capture.

A storage (cut sheet or continuous forms) reader module may be employed to help in the control of security base stock input and output ("I/O") from the storage areas. This module is otherwise comparable to the press/collator module, mounted on a cut sheet/continuous forms paper transport. Such a module is particularly useful where there is an intermediate storage area in the production process, such as, for example, where the check base stock is printed in a different plant from where the checks are personalized and finished. Thus, the module may be applied to control the check base stock in the custody of each operator.

A pre-marking input module prevents base stock other than that assigned to a specific operator to be fed into the pre-marking equipment. It is mounted on the input paper path and has elements including a local image capture controller, and at least one high-speed OCR progressive scan camera. Depending on the available space, this camera may be a miniature camera with a special and/or dedicated light source.

A pre-marking output module 218 is present in all embodiments. This module is mandatory for all Checkbolt production subsystems. One for each pre-marking equipment. All of the other modules are added depending upon the desired level of control. The pre-marking output module controls the bases that leave the pre-marking equipment as blank checks, reads the check base stock identification number and the MICR line and generates the unique identification information for each check. The module is installed after the MICR line printing engine and includes a local image capture controller that receives the information from the cameras/scanners/readers, processes it by applying the required filters or functions, and sends the interpreted information to the server 202.

The pre-marking output module 218 has a software application that handles the image and character recognition processing functions. It also has at least one high-speed OCR camera, scanner o reader where the number may depend on the width of the reading field. The cameras can be progressive or linear scan, depending on the number, code type (e.g., numeric, bar code, etc.) or the nature (e.g., visible or invisible) of the fields that the module is designed to capture.

A checkbook-finishing module 220 reads the checkbooks that enter the finishing process. It includes a local capture controller that receives the information from the cameras, scanners or readers, processes it by applying the required filters or functions, and sends the interpreted information to the server 202. It includes a software application to handle the data processing functions, and as many high-speed OCR cameras or Bar Code scanners as desired, depending on the type and width of the reading field and the steps of the checkbook finishing process.

A checkbook finishing quality verification module 222 is a visual verification station for quality assurance. Here, the operator verifies printing quality (e.g., base stock, personalization and MICR line), checkbook integrity (e.g., number of checks and inserts in accordance with the type of checkbook in process) and checkbook finishing quality. All special checkbooks or 1/n checkbooks (where n is the number of checks per page on the base stock) must pass through this station. The captured information in this module is sent to the server 202. The module includes a personal computer ("PC") running the verification module application, a Bar Code reader, scanner and/or a manual digital camera connected to the PC.

Along with the finished checkbooks, the final product of the Checkbolt production subsystem is the Produced Check File, that is the input to the Checkbolt Second phase or Bank/Customer subsystem of FIG. 3.

The Checkbolt bank/customer subsystem has a black box 310 to integrate, maintain, and control access to the Check Security information of the Checkbolt system that has three data structures, the Historic Database 312, the Live Check Database 314, and the Activity Log 316, protected by a hardware/software module named Digital Police 318 of FIG. 3, all the elements in an encrypted environment.

The Black Box is the core of the Checkbolt Bank/Customer subsystem. It has all the information on the live checks and is integrated to the Bank/Service Provider data network (LAN/WAN), thus allowing the verification of the authenticity of each check presented for payment at any workstation, teller or point of sale terminal in the network.

Depending on the service parameters and the bank/service provider infrastructure, the black box may be implemented entirely as a software structure or as a combination of hardware and software, The Black Box is fully integrated to the check process application of the Bank, and may be installed as a disk file within the application.

The Checkbolt bank/customer subsystem has a black box 310 to integrate, maintain, and control access to the Check Security information of the Checkbolt system that has three data structures, the Historic Database 312, the Live Check Database 314, and the Activity Log 316, protected by a hardware/software module named Digital Police 318 of FIG. 3, all the elements in an encrypted environment.

The historic database 312 is a preferred source of information to investigate check frauds. The Log File 316 keeps records of all of the transactions to the Black Box, registering the origin of the transaction, purpose, target, result and date/time information. The Live Check database 314 keeps the unique check IDs for all of the valid checks that are available for use, i.e. the "live checks".

The digital police 318 processes all the transactions that the black box receives, verifying the right code or encryption, the authorized user/workstation/terminal/software module, the right function and keeps a detailed record of all activities at the Activity Log 316.

The Checkbolt Bank/Customer subsystem also has several software modules that updates the data structures on the black box and performs the verification and investigation processes. All software modules are controlled by the Black box administrator module.

A production software module 322 of FIG. 3 receives the Produced Check File 323 generated at the Checkbolt Production subsystem that is a detailed register of unique identifications for each produced check. Every entry in the produced checks file 323 contains a unique check ID. This file also comprises the production historic information, the detailed data generated at each production control module, including all entries and deliveries of base stock that enters the printing process, keeping track of each of them. With this produced check file this software module updates the Historic Database and the Live Checks Database.

There are several statuses available for the checks in the Live Data Base. Valid Checks include all the checks reported to the system by the production subsystem. Delivered Checks include two possible statuses: When the checkbooks are delivered to the Bank and its branches, and/or when the checkbooks are delivered to the account holder. At the time of transfer from the Bank to the Account Holder, the check responsibility is likewise transferred from the bank to the account holder.

The Distribution Update software module 324 handles all the checkbook distribution process from the print shop to the different branches of the bank, keeping track of all events during the process, generating the delivered checkbook file 325. Once the delivery process is finished, the system updates with file 325 the Historic and Live Databases on the Black Box. This module keeps track of the checkbooks delivered to the Bank/Branch/Distributor, compares them against the produced check file, reports the differences and updates the Live Check database 314.

The Customer Delivery Update software module 326 handles the checkbook delivery to the account owner/customer generating the delivered checkbook file 327. Once the process is finished, the system updates with file 327 the Historic and Live Databases on the Black Box. At this point of the process, when the account owner has responsibility on the checkbook, the Valid Checks are transformed into Live Checks within the Live Checks Database. No checks that are not in this status are considered valid by the Checkbolt system.

The Positive Pay Update software module 328 handles the positive pay process in which the account owner daily reports (or as often as needed) the issued checks, cancelled checks, lost/stolen checks. This module provides the user and data interfaces to perform the check reporting process as easy and fast as possible, manually or automatically according with the volume of checks in the report. Each report generates a Issued/lost check file 329, which in turn will be used to update the Historic and the Live Check Databases in the Black Box.

The system keeps track of the check amount and payee name after they are reported. Reported Checks also include Cancelled Checks, which are marked accordingly in the corresponding entries of the database, and Lost/Stolen checks, which are removed from the Live Check Database 314 and transferred to a special high-risk area in the Historic database 312.

An Account Holder Check Control Module captures the check activity from the account holder, who should report the issued checks with the amount and the payee; as well as cancelled and lost/stolen check numbers. This module is optional to the account holder, and protects the account holder against cloned or altered checks from the moment a checkbook was received to the moment the payee presents the check for cashing. This module has several versions depending on the volume of checks reported and the account holder, including an Internet Check Report module, an e-mail Check Report module, a file transfer protocol ("FTP") Check Report module, and an Application Program Interface ("API") Check Report module for interface with common checking account applications.

The Account Holder Check Control Module also handles check protection services. Thus, when the customer (e.g., account holder/payee) asks for check protection service, the system returns an electronic signature integrated as the result of applying a function to the unique check ID, amount, and payee data The Transaction Validation software module 330 handles the authentication and verification processes in the Checkbolt system. When a check is received by the teller the Check base ID and the check/account number from the MICR line are captured in the Checkbolt system. With these data the unique id is calculated and then transferred for validation to the Live Check Database at the Black Box. If the transaction finds a match within the Live Checks Database, the teller receives a "valid" answer. If there is no match for the calculated id in the Live Checks Database, the teller receives an "invalid" answer. This is the main service provided by the Checkbolt antifraud check security system. Other verification services also provided by the Checkbolt system and handled by this module are optional and complementary like valid account, signature verification, account owner name and address forgery, and enough funds in the account.

An optional Teller Check Reader Module 332, to automate the verification process may be installed at a teller position and connected to the corresponding workstation. This module reads the MICR line verifying the correct magnetic levels, acquires images of both sides of the check, and sends the information to the workstation and, from there, to the Bank/Service provider's wide area network ("WAN") and/or local area network ("LAN"). This module includes options to preserve the check image for a short period, verify the signature image against a signature file, and check protection electronic signature validation.

The system also has a point of sale ("POS") module in which the Check Reader Module 332 is installed at points of sale terminals allowing the check verification at affiliated organizations. This module reads the MICR line and takes images of both sides of the check, and typically includes a veriphone terminal. The functions of this module are the same of the Teller module. The Investigations software module 320 provides that, in case of fraud, authorized investigators can gain access to the Black Box 310 information, specially the historic database 312, through this module. This module requires at least two user signatures or passwords of the appropriate access level. The module can be installed in any PC on the network.

Once the check is paid, the register is removed from the Live Check Database and moved to the Historic database.

Thus, in case of check fraud, access to the historic database allows the accurate retrieval of responsibility definitions. The responsibility level may be as detailed as that allowed by the installed configuration. With a fully optioned configuration, the responsibilities reach to the personal level. For example, if the fraudulent check base stock identification is entered to the Historic database, the system may answer that the last production step recorded for that base stock was at the output of the press. That means that it was stolen after that point. Then the destruction acts may be verified. The responsible party would then be traceable to the supervisor that signed for the destruction of that base stock.

A Control Level Matrix, such as that shown in Table 1, provides a configuration structure of the modules of the check anti-fraud security system. Thus, the matrix lists the function of each module on an increasing security scale, from the minimum to the maximum levels of security ("S.L.") that the system embodiment provides. The second column of the table indicates whether a module is optional ("O") by inclusion of the "+" symbol.

Checkbolt offers security advantages of fingerprint and intelligent card combination access, where combination access is preferably required for high-risk areas. Another advantage is that the system allows the definition of functions specific to each user such that the user has access only to those predefined functions. Another advantage is that production users do not have access to security reports. Another advantage is that a special high-security procedure is required to access the valid check file.

These and other features and advantages of the present disclosure may be readily ascertained by one of ordinary skill in the pertinent art based on the teachings herein. It is to be understood that the teachings of the present disclosure may be implemented in various forms of hardware, software, firmware, special purpose processors, or combinations thereof.

Most preferably, the teachings of the present disclosure are implemented as a combination of hardware and software. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may

TABLE 1

| S.L. | O | CONFIGURATION | CHARACTERISTICS | COMMENTS |
|---|---|---|---|---|
| 0 |   | Check Anti-Fraud Security Production Subsystem - Pre-marking Output Module | Ability to define responsibilities between Bank and Check Printer |   |
| 1 | + | Check Anti-Fraud Security Bank/Customer Subsystem - Black Box, Production Update Module, Investigations Module and Investigation Workstation | Ability to define valid checks |   |
| 2 | + | Check Transaction Validation Module and Teller/POS Check Reader Modules | Ability to define valid checks at the cashing point |   |
| 3 | + | Account Holder Check Control Module | Ability to verify issued checks, cancelled and lost/stolen checks |   |
| 4 | + | Check Protection Service Option | Ability to protect checks at the issuing/receiving points |   |
| 5 | + | Delivered Checkbook Module | Ability to transfer responsibility to the account holder; Ability to detect checkbook differences from production information |   |
| 6 | + | Storage Control Module and Cut Sheet/Continuous Forms Reader Module | Ability to control reception and delivery of security base stock; Track Production security base stock balance; Track Destruction Acts |   |
| 7 | + | Finishing Module | Ability to control the checkbook finishing process and match it with the check production module and the production information file |   |
| 8 | + | Press/Collator Module | Ability to control the differences in each step of the production process; Ability to define personal responsibilities, which adds detail to the Production security base stock balance and the Historic data base | One module in each production equipment unit |
| 9 | + | Pre-marking Input Module | Prevents pre-marking operators from feeding security base stock different from the lot assigned to him. |   |
| 10 | + | Quality Verification Workstation | Increases the quality level of the production process |   | also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and method function blocks depicted in the accompanying drawings are preferably implemented in software, the actual connections between the system components or the process function blocks may differ depending upon the manner in which the present disclosure is programmed. Given the teachings herein, one of ordinary skill in the pertinent art will be able to contemplate these and similar implementations or configurations of the present disclosure.

As will be recognized by those of ordinary skill in the pertinent art based on the teachings herein, alternate embodiments are possible, such as, for example, an optical computing embodiment. Given the teachings of the disclosure provided herein, those of ordinary skill in the pertinent art will contemplate various alternate configurations and implementations of the production unit 200 and the validation unit 330, as well as the other elements of the disclosed systems, while practicing within the scope and spirit of the present disclosure.

Although the illustrative embodiments have been described herein with reference to the accompanying drawings, it is to be understood that the present disclosure is not limited to those precise embodiments, and that various changes and modifications may be effected therein by one of ordinary skill in the pertinent art without departing from the scope or spirit of the present disclosure. All such changes and modifications are intended to be included within the scope of the present disclosure as set forth in the appended claims.

What is claimed is:

1. A method for check anti-fraud security comprising:
   identifying sheets of check base stock with unique base identifiers that are each invisible code results of an algorithm, wherein each base identifier uniquely identifies a corresponding check-sized portion of base stock, respectively;
   receiving a plurality of identified sheets at a printing device;
   printing transit or routing number, account number and sequential check number in at least magnetic ink character recognition (MICR) line format on each of a plurality of received sheets to form blank checks;
   at least one of imaging, scanning or reading said base identifier and said MICR line from each of said blank checks;
   generating a unique blank check identification tag responsive to said base identifier and said MICR line for each of said blank checks;
   storing the unique blank check identification tag in a database; and
   providing a validation signal in accordance with the database when a completed check corresponding to a unique blank check identification tag from the database is issued to a recipient or presented for payment.

2. A method as defined in claim 1, further comprising:
   receiving base stock;
   at least one of imaging, scanning or reading check base identifiers of the base stock;
   storing the check base stock identifiers in the database;
   controlling the use of the base stock in a production process;
   correlating each check base stock identifier with the corresponding MICR line of a blank check; and
   storing the correlation information in the database as a unique blank check identification tag.

3. A method as defined in claim 2 wherein said correlating is performed contemporaneously with said printing.

4. A method as defined in claim 2, further comprising updating the database with checkbook delivery information contemporaneously with at least one of distribution to a bank and distribution to an account holder.

5. A method as defined in claim 1, further comprising:
   at least one of reading or scanning a check presented for payment;
   validating the check in accordance with the database;
   moving the validated unique blank check identification tag from the database to an historic database; and
   updating a log database.

6. A method as defined in claim 5 wherein the database is a live checks database, and each of the live checks database, the historic database and the log database comprise encrypted access paths.

7. A method as defined in claim 5 wherein said validation signal comprises one of a Valid or an Invalid answer.

8. A method as defined in claim 5, further comprising:
   maintaining a lost check database and a cancelled check database; and
   providing a validation signal responsive to the check presented for payment in accordance with the databases.

9. A method as defined in claim 1 wherein identifying the check base stock with unique base identifiers on each of the plurality of blank checks occurs as early in the printing process as possible.

10. A method as defined in claim 1 wherein:
    the unique blank check identification tags stored in the database are not physically indicated on any check, and
    the validation signal is provided in response to a completed check having a unique base identifier and a MICR line corresponding to those of a unique blank check identification tag from the database.

11. A method as defined in claim 10 wherein the unique blank check identification tag is derived from at least one secret key or algorithm, which, in turn, is only known to a secure computer server running a program having clearance to interface a vetted remote operator with the database over an encrypted channel.

12. A method as defined in claim 1 wherein the unique base identifiers are bi-dimensional matrices globally unique among all check-sized portions of base stock.

13. A computer-readable medium tangibly embodying a program of instructions executable by a machine to perform method steps for check anti-fraud security, the method steps comprising:
    identifying sheets of check base stock with unique base identifiers that are each invisible code results of an algorithm, wherein each base identifier uniquely identifies a corresponding check-sized portion of base stock, respectively;
    receiving a plurality of identified sheets at a printing device;
    printing transit or routing number, account number and sequential check number in at least magnetic ink character recognition (MICR) line format on each of a plurality of received sheets to form blank checks;

at least one of imaging, scanning or reading said base identifier and said MICR line from each of said blank checks;
generating a unique blank check identification tag responsive to said base identifier and said MICR line for each of said blank checks;
storing the unique blank check identification tag in a database, and
providing a validation signal in accordance with the database when a completed check corresponding to a unique blank check identification tag from the database is issued to a recipient or presented for payment.

14. A computer-readable medium as defined in claim 13, the steps further comprising:
receiving base stock;
imaging check base identifiers of the base stock;
storing the check base stock identifiers in the database;
controlling the use of the base stock in a production process;
correlating each check base stock identifier with the corresponding MICR line of a blank check; and
storing the correlation information in the database as a unique blank check identification tag.

15. A computer-readable medium as defined in claim 14 wherein said correlating step is performed contemporaneously with said printing.

16. A computer-readable medium as defined in claim 14, the steps further comprising updating the database with checkbook delivery information contemporaneously with at least one of distribution to a bank and distribution to an account holder.

17. A computer-readable medium as defined in claim 13, the steps further comprising:
reading a check presented for payment;
providing a validation signal responsive to the read check in accordance with the database;
moving the validated unique blank check identification tag from the database to an historic database; and
updating a log database.

18. A computer-readable medium as defined in claim 17 wherein the database is a live checks database, and each of the live checks database, the historic database and the log database comprise encrypted access paths.

19. A computer-readable medium as defined in claim 17 wherein said validation signal comprises one of a Valid or an Invalid answer.

20. A computer-readable medium as defined in claim 17, the steps further comprising:
maintaining a lost check database and a cancelled check database; and
providing a validation signal responsive to the check presented for payment in accordance with the databases.

21. A computer-readable medium as defined in claim 13 wherein the unique base identifiers are bi-dimensional matrices globally unique among all check-sized portions of base stock.

22. A check anti-fraud security system comprising:
identification means for identifying sheets of check base stock with unique base identifiers that are each invisible code results of an algorithm, wherein each base identifier uniquely identifies a corresponding check-sized portion of base stock, respectively;
receiving a plurality of identified sheets at a printing device;
printing means for printing transit or routing number, account number and sequential check number in at least magnetic ink character recognition (MICR) line format on each of a plurality of received sheets to form blank checks;
receiving means for at least one of imaging, scanning or reading said base identifier and said MICR line from each of said blank checks;
data processing means for generating a unique blank check identification tag responsive to said base identifier and said MICR line for each of said blank checks;
storing means for storing the unique blank check identification tag in a database; and
validating means for providing a validation signal in accordance with the database when a completed check corresponding to a unique blank check identification tag from the database is issued to a recipient or presented for payment.

23. A system as defined in claim 22 further comprising:
receiving means for receiving base stock;
second receiving means for at least one of imaging, scanning or reading check base stock identifiers of the base stock;
second storing means for storing the check base stock identifiers in the database;
correlating means for correlating each unique base stock identifier with the corresponding MICR line of a blank check; and
third storing means for storing the correlation information in the database as a unique blank check identification tag.

24. A system as defined in claim 23 wherein said correlating means is disposed for contemporaneous use with said printing means.

25. A system as defined in claim 23, further comprising sixth data processing means for updating the database with checkbook delivery information contemporaneously with at least one of distribution to a bank and distribution to an account holder.

26. A system as defined in claim 22, further comprising:
third receiving means for at least one of scanning or reading a check presented for payment;
first data processing means for validating the read check in accordance with the database;
second data processing means for moving the validated unique blank check identification tag from the database to an historic database; and
third data processing means for updating a log database.

27. A system as defined in claim 26 wherein the database is a live checks database, and each of the live checks database, the historic database and the log database comprise encrypted access paths.

28. A system as defined in claim 26 wherein said first data processing means comprises returning means for returning one of a Valid or an Invalid answer.

29. A system as defined in claim 26, further comprising:
fourth data processing means for maintaining a lost check database and a cancelled check database; and
fifth data processing means for validating the check presented for payment in accordance with the databases.

30. A system as defined in claim 22 wherein the unique base identifiers are bi-dimensional matrices globally unique among all check-sized portions of base stock.

31. A system for check anti-fraud security comprising:
a production apparatus for identifying sheets of check base stock with unique base identifiers that are each invisible code results of an algorithm, wherein each base identifier uniquely identifies a corresponding check-sized portion of base stock, respectively;

a printer for receiving a plurality of identified sheets, and printing transit or routing number, account number and sequential check number in at least magnetic ink character recognition (MICR) line format on each of a plurality of received sheets to form blank checks;

an input device coupled to the production apparatus for at least one of imaging, scanning or reading said unique base identifier and said MICR line from each of said blank checks;

a database in signal communication with the input device for storing a unique blank check identification tag responsive to said base identifier and said MICR line for each of said blank checks; and a check validation infrastructure in signal communication with the database for providing a validation signal in accordance with the database when a completed check corresponding to a unique blank check identification tag from the database is issued to a recipient or presented for payment.

32. A system as defined in claim 31 wherein the production apparatus comprises a printer.

33. A system as defined in claim 31, further comprising a second input device in signal communication with the database for at least one of imaging, scanning or reading check base stock identifiers of base stock prior to printing.

34. A system as defined in claim 31, further comprising at least one biometric device in signal communication with the database for verifying the identity of a user.

35. A system as defined in claim 31, further comprising a MICR reader in signal communication with the check validation infrastructure for at least one of imaging, scanning or reading a base identifier and a MICR line of the issued check prior to validation.

36. A system as defined in claim 31 wherein the unique base identifiers are bi-dimensional matrices globally unique among all check-sized portions of base stock.

* * * * *